Patented Sept. 23, 1952

2,611,768

UNITED STATES PATENT OFFICE 2,611,768

UNSATURATED QUATERNARY AMMONIUM HALIDES OF CERTAIN SATURATED HETEROCYCLICS AND PROCESS OF PREPARATION

George B. Butler and Robert L. Bunch, Gainesville, Fla., assignors to Board of Commissioners of State Institutions of the State of Florida No Drawing. Application October 18, 1949, Serial No. 122,124

11 Claims. (Cl. 260—247)

This invention relates to a method for preparing unsaturated quaternary ammonium halides having at least two unsaturated groups attached to the pentavalent nitrogen and to the new unsaturated quaternary compounds resulting therefrom.

It is an object of this invention to produce a new class of quaternary ammonium derivatives which contain at least two unsaturated alkene radicals attached to a pentavalent nitrogen in combination with radicals selected from the group consisting of alkyl, monocyclic, heterocyclic, aryl, alkene and halogen radicals.

More particularly, it is an object of this invention to produce nitrogeneous compounds having at least two unsaturated radicals attached to the pentavalent nitrogen which are capable of being polymerized into thermosetting water-insoluble polymers suitable for ion exchange resins.

It is a further object of this invention to prepare unsaturated ammonium halides from readily available raw materials by a process capable of being carried out with standard laboratory equipment.

These objects are attained according to the herein described invention wherein nitrogeneous compounds are reacted with hydrocarbon derivatives in order to produce pentavalent nitrogen compounds with at least two of the substituent groups being linear unsaturated radicals joined to the pentavalent nitrogen by a single bond. It has been found that an entirely new class of ammonium compounds results.

For example, this invention pertains to pentavalent nitrogen compounds having the following general formulae:

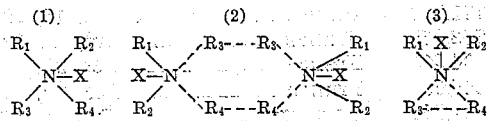

wherein X represents a non-hydrocarbon radical such as halogen, $R_1$ and $R_2$ represent unsaturated hydrocarbon radicals, and $R_3$ and $R_4$ represent radicals selected from the group consisting of alkyl, monocyclic, heterocyclic, alkene, and aryl radicals.

The preparation of the new unsaturated quaternary ammonium halides may more readily be understood by a consideration of the following illustrative examples of the laboratory preparation of the products of this invention.

EXAMPLE I

*Butyl triallyl ammonium bromide.*—One mole of allyl bromide was added dropwise with stirring to one mole of butyl diallyl amine, using acetophenone as solvent. A small amount of heat was applied to start the reaction. The product was recrystallized from ethyl alcohol. Yield: 77%; M. P. 175° C.; analysis: per cent Br calculated: 29.14; per cent Br found: 28.98.

EXAMPLE II

*Tetrallyl piperazinium dibromide.*—Two moles of allyl bromide was added dropwise to one mole of N, N'-diallyl piperazine, using acetophenone as solvent. The temperature of the reaction was increased slowly from 80° C. to 170° C. as the reaction proceeded. The white crystalline solid was recrystallized from alcohol. Yield: 67%; M. P. 207° C.; analysis: calc.: 39.25% Br; found: 39.26% Br.

EXAMPLE III

*Diallyl morpholinium chloride.*—A solution of one mole of allyl chloride and one mole of allyl morpholine, in 50 cc. of acetophenone was heated at 110° C. for two hours in a rocking autoclave. A yield of 65% of the salt was obtained after purification by recrystallization from alcohol. M. P. 180° C.; analysis: calc.: 17.41% Cl; found: 17.29% Cl.

EXAMPLE IV

*Di(B-methylallyl) piperidinium bromide.*—One mole of B-methylallyl bromide was added dropwise with stirring to a solution of one mole of B-methylallyl piperidine in acetophenone. The reaction was heated under gentle reflux for one and one-half hours. The solid product which separated was purified by recrystallization from ethyl alcohol. Yield 63%; M. P. 175° C.; analysis: calc.: 29.14% Br; found: 29.21% Br.

EXAMPLE V

*Diallyl di(B-methylallyl) piperazinium dibromide.*—A two to one molar ratio of allyl bromide and N,N'-di(B-methylallyl) piperazine in acetophenone was heated for one hour after the dropwise addition of the allyl bromide, with stirring, was complete. The white solid which separated was purified by dissolving in ethyl alcohol and salting out with ether. Yield: 54%; M. P. 182° C.; analysis: per cent Br calc.: 36.63; per cent Br found: 35.57.

EXAMPLE VI

*Allyl B-methylallyl piperidinium bromide.*—An equal molecular ratio of allyl bromide and B-methylallyl piperidine in acetophenone as solvent was heated slightly to start the reaction which proceeded without further heating. The solid product was purified by dissolving in chloroform and salting out with ether. Yield: 72%; M. P. 195.5° C.; analysis: per cent Br calc.: 30.71; per cent Br found: 31.10.

EXAMPLE VII

*Allyl B-methylallyl morpholinium bromide.*—One mole of allyl bromide was added dropwise with stirring to one mole of B-methylallyl morpholine, using acetophenone as solvent. The reaction was heated for one and one-half hours. The solid product was purified by dissolving in chloroform and salting out with ether. Yield: 53%; M. P. 197° C.; analysis: per cent Br calc.: 30.48; per cent Br found: 30.56.

EXAMPLE VIII

*Benzyl triallyl ammonium bromide.*—Using an equimolecular ratio of reactants, allyl bromide was added dropwise with stirring to benzyl diallyl amine, using acetophenone as solvent. The product was recrystallized from ethanol. Yield: 71%; M. P. 132° C.; analysis: per cent Br calc.: 25.93; per cent Br found: 25.70.

EXAMPLE IX

*Diallyl piperidinium bromide.*—Using an equimolecular ratio of reactants allyl bromide was added dropwise with stirring to allyl piperidine, using acetophenone as solvent. The solid was purified by recrystallization from a mixture of chloroform and ether. The pure compound decomposed on slow heating. It had a flash melting point of 190° C. Yield: 79%; analysis: per cent Br Calc.: 32.47; per cent Br found: 32.64.

EXAMPLE X

*Diallyl morpholinium bromide.*—One mole of allyl bromide was added dropwise to one mole of allyl morpholine dissolved in 100 cc. of acetophenone. The reaction was complete upon completion of the addition of the allyl bromide. The product was purified by recrystallization from ethanol. Yield: 89%; M. P. 213° C.; anal.: per cent Br calc.: 32.2; per cent Br found: 32.3.

EXAMPLE XI

*Ethyl triallyl ammonium bromide.*—One mole of allyl bromide was added dropwise with stirring to one mole of ethyl diallyl amine, using acetophenone as solvent. The reaction flask was heated at 78° C. for two hours. The solid product was filtered, washed with ether and recrystallized from chloroform. Yield: 77%; M. P. 159° C.; anal.: calc.: 37.47% Br; found: 32.65% Br.

Many different embodiments of this invention may be made without departing from the spirit or scope thereof. It is understood that the invention is not limited to the specific embodiments thereof except as defined in the appended claims.

We claim:

1. A quaternary ammonium halide suitable for polymer formation comprising a saturated six membered heterocyclic ring having at least one pentavalent nitrogen atom incorporated therein with up to one oxygen atom along with sufficient CH$_2$ groups to complete the heterocyclic ring, the remaining valence bonds of said nitrogen being satisfied by a halogen and two alkenyl radicals containing less than eight carbon atoms.

2. Tetra allyl piperazinium dibromide.
3. Allyl B-methylallyl morpholinium bromide.
4. Diallyl morpholinium chloride.
5. Diallyl di (B-methylallyl) piperazinium dibromide.
6. A process for the preparation of unsaturated quaternary ammonium salts which comprises reacting an unsaturated aliphatic halide with a saturated six membered heterocyclic compound having at least one trivalent amino nitrogen in said heterocyclic ring and up to one oxygen atom along with sufficient CH$_2$ groups to complete the heterocyclic ring, the remaining valence bond of said nitrogen being satisfied by an alkenyl radical containing less than eight carbon atoms, in the presence of acetophenone as a solvent while maintaining the temperature at a sufficient elevation to carry the reaction to completion.
7. A process as claimed in claim 6 in which the unsaturated aliphatic halide is allyl bromide.
8. A process as claimed in claim 6 in which the heterocyclic compound is B-methylallyl morpholine.
9. A process as claimed in claim 6 in which the unsaturated aliphatic halide is allyl bromide and the nitrogenus compound is N,N'-diallyl piperazine.
10. A process as claimed in claim 6 in which the unsaturated aliphatic halide is allyl bromide and the heterocyclic compound is N,N'-di(B-methylallyl) piperazine.
11. A process as claimed in claim 6 in which the unsaturated aliphatic halide is methallyl bromide and the heterocyclic compound is N,N'-diallyl piperazine.

GEORGE B. BUTLER.
ROBERT L. BUNCH.

REFERENCES CITED

The following references are of record in the file of this patent:

UNITED STATES PATENTS

| Number    | Name      | Date           |
|-----------|-----------|----------------|
| 2,191,922 | Bruson    | Feb. 27, 1940  |
| 2,295,504 | Shelton   | Sept. 8, 1942  |
| 2,309,592 | Hueter    | Jan. 26, 1943  |
| 2,349,752 | Pollack   | May 23, 1944   |
| 2,366,727 | Gunderson | Jan. 9, 1945   |
| 2,464,260 | Rieveschl | Mar. 15, 1949  |
| 2,483,749 | Wittcoff  | Oct. 4, 1949   |

FOREIGN PATENTS

| Number  | Country       | Date           |
|---------|---------------|----------------|
| 771,746 | France        | Oct. 15, 1934  |
| 782,930 | France        | July 5, 1935   |
| 804,391 | France        | Oct. 22, 1936  |
| 806,662 | France        | Dec. 22, 1936  |
| 681,850 | Germany       | Oct. 3, 1939   |
| 609,454 | Great Britain | Sept. 30, 1948 |

OTHER REFERENCES

Steinkopf et al.: Chem. Abs., vol. 19 (1925), pp. 1402–1403.

Solvents in Synthetic Org. Chem., MacArdle (Van Nostrand Co., N. Y.), p. 105.